United States Patent
Garcia

(10) Patent No.: US 7,522,988 B2
(45) Date of Patent: Apr. 21, 2009

(54) METHOD FOR MONITORING FUNCTIONAL COMPONENTS OF A MOTOR VEHICLE

(75) Inventor: Patrick Garcia, Neewiller (FR)

(73) Assignee: Heinrich Gillet GmbH, Edenkoben (DE)

( * ) Notice: Subject to any disclaimer, the term of this patent is extended or adjusted under 35 U.S.C. 154(b) by 0 days.

(21) Appl. No.: 11/962,032

(22) Filed: Dec. 20, 2007

(65) Prior Publication Data

US 2008/0154482 A1 Jun. 26, 2008

(30) Foreign Application Priority Data

Dec. 20, 2006 (DE) .................. 10 2006 060 286

(51) Int. Cl.
*G01M 15/00* (2006.01)
*F02D 41/00* (2006.01)

(52) U.S. Cl. ..................................... 701/111

(58) Field of Classification Search .............. 701/111, 701/115; 73/117.3
See application file for complete search history.

(56) References Cited

U.S. PATENT DOCUMENTS 6,668,812 B2 * 12/2003 Javaherian .................. 701/111

* cited by examiner

*Primary Examiner*—Hieu T Vo
(74) *Attorney, Agent, or Firm*—Muncy, Geissler, Olds & Lowe, PLLC

(57) ABSTRACT

A method for monitoring functional components of a motor vehicle is provided. To this end, microphones, pulsation sensors, strain gauges and a speed sensor are positioned on or next to one of the functional components to be monitored. The electrical signals of the microphones, pulsation sensors, strain gauges, and speed sensor are measured, analyzed by means of Fourier analysis and compared with an acoustic signature.

10 Claims, 1 Drawing Sheet

METHOD FOR MONITORING FUNCTIONAL COMPONENTS OF A MOTOR VEHICLE

This nonprovisional application claims priority under 35 U.S.C. § 119(a) to German Patent Application No. DE 102006060286, which was filed in Germany on Dec. 20, 2006, and which is herein incorporated by reference.

BACKGROUND OF THE INVENTION

1. Field of the Invention

The present invention relates to a method for monitoring functional components of a motor vehicle, including an internal combustion engine, an exhaust system having a manifold, catalytic converter, diesel particulate filter, front muffler, mid muffler, rear muffler, exhaust pipes and/or tailpipe, and an intake system having an intake muffler and/or intake pipes.

2. Description of the Background Art

Known from WO 98/01 728, which corresponds to U.S. Pat. No. 6,347,285, is a device for detecting analog measurement signals for the acoustical diagnosis of test pieces. In this process, analog measurement signals from a test piece can be recorded with the aid of vibration transducers. A computer is equipped with a standard interface card that serves to digitize the measurement signals. A switching signal is used to produce a carrier signal that can be input through an interface that is preferably serial. A control program in the computer switches the input of measurement signals on and off by means of the carrier signal.

DE 42 07 728 A1 describes a method for quality testing of test objects wherein the test objects to be examined are excited into emitting sound waves by an external pulsed excitation, wherein the emitted sound waves are detected in a sound detector, and wherein a sorting of the test objects into at least two quality classes takes place based on the detected sound. In this context, the classification of the sound spectrum of the test objects takes place through a neural network.

DE 40 17 448 A1 describes a method for diagnosing the mechanical characteristics of machines in which rotating components that cause vibrations are present. In order to produce a rapid and reliable method with which routinely acquired vibration patterns can be processed to diagnose typical machine defects, the detection signal is transformed from the time domain into the frequency domain by a frequency transform method, and the investigation of the signal is performed in the frequency domain.

Known from WO 96/13 011, which corresponds to U.S. Pat. No. 5,602,757, is a vibration monitoring system for a machine, which includes a microcontroller and a machine that is to be monitored. The machine includes at least one rotating element and at least one sensor for converting mechanical vibrations of the machine into a corresponding electrical signal that is analyzed by the microcontroller.

U.S. Pat. No. 5,109,700 describes a method and an apparatus for analyzing rotating machines. Here, a vibration transducer connected to a rotating machine senses the vibration of the machine and generates a corresponding electrical output signal. The apparatus is provided for analyzing the electrical signal and for outputting or representing the signal level, the rotational speed, and the condition of the bearing of the machine.

DE 198 31 457 A1 describes an after-market device for detecting the exhaust gas composition in motor vehicles that are not equipped with OBD technology as standard equipment. If an assembly that is to be monitored fails or has a malfunction, a signal light on the dashboard is activated and is stored as a failure rate. The identified malfunction can be read out at a later time through a standardized interface in a workshop for identification and correction of the failure, for example.

In the engine operating system according to DE 199 16 927 A1, which corresponds to U.S. Pat. No. 6,076,348, the signal from a sensor in the exhaust pipe is used within a feedback loop for controlling the air/fuel ratio in the combustion chamber. To this end, the signals of the exhaust gas component sensor are statistically analyzed by the motor controller and are processed for controlling the fuel delivery system. In this way, near-real-time feedback is achieved between the actual state and the exhaust gas aftertreatment device and the technical causes thereof.

Regardless of whether the diagnostic parameters determined by means of OBD are used immediately or not used until a later time, it is always necessary to evaluate these parameters. The critical point is an assessment of whether the parameters characterize a correct state or a faulty state. The OBD system typically has a preprogrammed characteristic curve, which is used as a basis for comparison for the later on-board measurement and off-board measurement. Especially for low-emissions concepts with correspondingly low OBD thresholds, a very precise distinction between the states "OK" and "not OK" is necessary. Statistical methods are a suitable solution option for this.

Statistical methods for evaluating diagnostic results are known in principle, wherein the method of classification is already in use in connection with OBD. Thus, for example, classification memories are present in prior art OBD control units, making it possible to first standardize the diagnostic results by means of a normalization function and then count them by classes. Another function is to store minimum or maximum diagnostic results by classes as a function of a characteristic diagnostic parameter.

Using the OBD method described in DE 44 34 197 C2, the condition of assemblies can also be diagnosed. Sensors which are in operative connection with the electronic engine control system are arranged on the assemblies to be monitored. The signal parameters of these sensors are first standardized by means of a normalization function. For this purpose, classifiers are proposed that can take the form of fixed classifiers for simple applications. Preferably, this diagnostic technique is based on trainable classifiers, which are trained or characterized using reference sensors with known operating characteristics or on the basis of statistically determined parameters. In this connection, multiple executions of decision loops may be necessary before a functional trainable classifier is produced. The diagnostic results are assigned to the classes of a classification memory on the basis of the standardization achieved by the normalization function. Next, using an evaluation function, it is possible to draw a conclusion regarding the condition of the monitored assemblies on the basis of the class assignments, in which either "OK" or "not OK" is determined in particular by comparison with a threshold value. This method is fundamentally suited for on-board diagnostics of motor vehicle assemblies that are relevant to emissions. In this context, the generation of the trainable classifiers by comparison of signal parameters to be normalized with stored, statistically determined signal parameters advantageously reduces development and test effort for the rules required to classify the sensors. However, it is disadvantageous that only a small number of classes can be implemented in the classification memory. A precise decision between the evaluations "OK" and "not OK" is thus questionable. Additional uncertainties with regard to the evaluation to be made are created by random dispersion of the diagnostic results. According to the disclosure in this document, preferably three classes are available in the classification memory, which, for example, characterize a fuel/air mixture in the states "rich/normal/lean". While this is indeed adequate for use in exhaust gas sensors, more classes have to be available for further differentiation or for other assemblies.

DE 101 55 647 A1 discloses an OBD method that makes possible an improved analysis of the diagnostic parameters. This is achieved, in particular, by the means that an adequately large number of classes is assigned in a classification memory, and thus an essentially exact evaluation of the state of the assemblies to be monitored is achieved. In addition, each class of the classification memory is assigned a weighting factor.

Finally, DE 39 32 436 A1, which corresponds to U.S. Pat. No. 5,072,391, discloses a diagnostic system for fault diagnosis in an electronic control unit in a motor vehicle, in which the electronic control unit has sensors and measurement devices for detecting various operating states in the motor vehicle and has a first memory device for storing the data supplied by the sensors and measurement devices. The diagnostic system also includes a diagnostic device with a control section in which a second memory device is provided for storing diagnostic programs for fault diagnosis in the electronic control unit. Also provided are a display element for displaying the diagnostic data, a keyboard for entering a diagnostic operating mode in the control section, and a device for connecting the diagnostic device to the electronic control unit. A second memory device for storing diagnostic programs for diagnosis of the electronic control unit is provided in the diagnostic device, and a third memory device for storing diagnostic programs for diagnosis of the electronic control unit is provided in the electronic control unit. Located in the diagnostic device is a designating unit for selective assignment of relevant primary and secondary functions to the electronic control unit and diagnostic device to produce a system with master devices and slave devices. A device for fault diagnosis in accordance with the diagnostic programs stored in the memory device in master mode is provided in the electronic control unit.

It is known that motor vehicles, especially those with internal combustion engines, contain a great number of components that during operation are subjected to greater or lesser loads and greater or lesser wear. Thus, for example, the internal combustion engine may run unevenly because the ignition is misadjusted, because the valves are misadjusted, because the fuel quality is incorrect, because the engine is being operated in the wrong load range, because a bearing is bad, because the intake system and/or the exhaust system are clogged or damaged, etc. The exhaust system is subject to wear caused by the high temperatures of the exhaust gases, the pulsations of the exhaust gases, the oscillations and vibrations caused by driving, and corrosion. This can cause damage to pipes and housings, damping material located in the muffler can be blown out, diesel exhaust particulate filters can be overloaded or clogged, catalytic converters can be destroyed, etc.

The intake system of the motor vehicle is also subject to wear. Likewise subject to wear is the auxiliary equipment found in motor vehicles, from the generator to the air conditioning system.

SUMMARY OF THE INVENTION

It is therefore an object of the present invention to provide a method via which the functional components of a motor vehicle can be monitored.

This object is attained in an aspect, by a method comprising the following steps: placing at least one microphone next to one of the functional components to be monitored; placing at least one pulsation sensor on one of the functional components to be monitored; placing at least one strain gauge on one of the functional components to be monitored; placing a speed sensor on the motor; measuring the electrical signals at the output of the microphones, pulsation sensors, strain gauges, and speed sensor on the motor; analyzing the signals by means of Fourier analysis and comparing the same with an acoustic signature.

The present invention analyzes the acoustic behavior on the basis of the acoustic signals that these components generate. These may be scraping or screeching bearing noises, increasingly loud pulsations of the exhaust system, whistling noises in the intake and/or exhaust system, and the like. It is advantageous here that simple, economical, and above all, reliable, sensors in the form of microphones, pulsation sensors and/or strain gauges can be used to convert the acoustic signals into electrical signals.

In order to refine the evaluation of the signals as to good or bad, a speed sensor can simultaneously be used, which reports the engine speed to the electronic analysis unit so that the fundamental frequency of the signals is always known.

The sensors may be arranged inside or outside the intake system, internal combustion engine, and exhaust system, as needed.

Primarily the following physical quantities are evaluated, although this is not a restrictive list: gas pressure, gas speed, mechanical vibrations, pulsation amplitudes, and pulsation frequencies.

According to a further embodiment, at least one thermocouple is placed on one of the included functional components. In this way, gas temperatures, housing temperatures, pipe temperatures, bearing temperatures, and the like, can be measured.

According to a further embodiment, a microphone can be placed on the generator. In this way, the generator bearings can be monitored.

According to an embodiment of the invention, a microphone can be placed on the air conditioning system. In this way, proper function of the air conditioning system can be monitored.

According to an embodiment of the invention, a microphone can be placed on the timing chain. In this way, the running of the timing chain can be monitored.

According to an embodiment of the invention, a microphone can be placed on the V-belt. In this way, the running of the V-belt can be monitored.

In order to record the acoustic signals of the functional elements to be monitored, piezoelectric transducers may be used.

Alternatively, electret microphones may also be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE illustrates an embodiment of the present invention.

DETAILED DESCRIPTION

Figure 1:
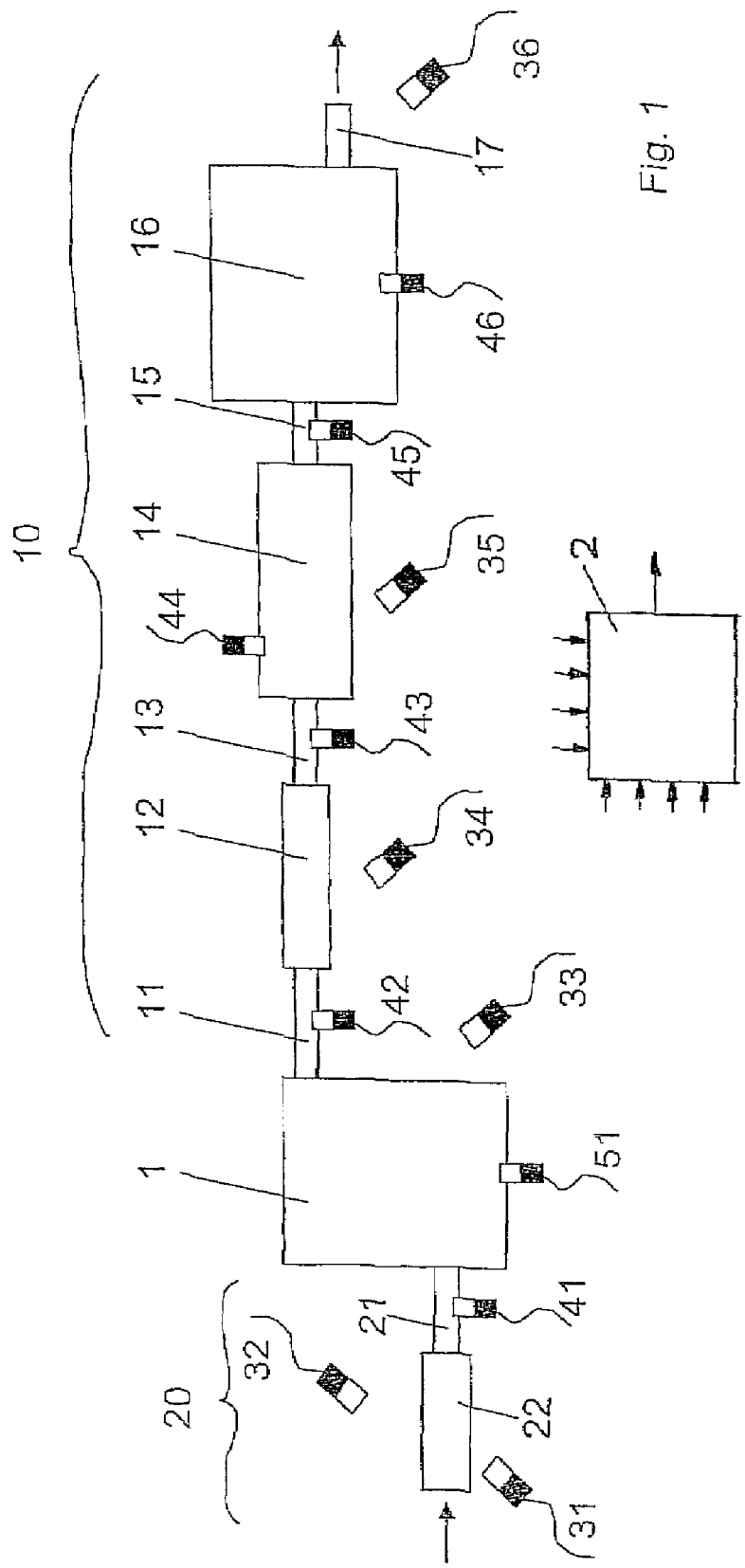

Visible is an internal combustion engine 1, which is followed by an exhaust system 10 and preceded by an intake system 20. The intake system 20 includes at least one intake muffler 22 and intake pipes 21. The exhaust system 10 includes manifold pipes 11, an exhaust gas catalytic converter and/or diesel exhaust particulate filter 12, header pipes 13, a mid muffler 14, connecting pipes 15, a rear muffler 16, and a tailpipe 17.

In order to be able to measure the acoustic characteristics of these functional components, including the mechanical vibrations, microphones 31, 32, preferably piezoelectric or electret microphones, are positioned next to the intake muffler 22.

A pulsation sensor 41 is placed in the intake pipe 21.

The acoustic signals of the internal combustion engine 1 are detected by a microphone 33 positioned next to the engine 1 and a pulsation sensor 51 built into the engine.

Pulsation sensors 42 are used in the manifold pipes 11 of the exhaust system 10.

The acoustic signals of the exhaust gas catalytic converter or diesel exhaust particulate filter 12 are recorded by a microphone 34 located adjacent thereto.

Pulsation sensors 43 are built into the header pipes 13.

The acoustic signals of the mid muffler 14 are detected by a microphone 35 located next to the muffler 14 and a pulsation sensor 44 placed in the muffler 14.

The acoustic signals of the exhaust pipe 15 are recorded by a pulsation sensor 45.

The sounds of the rear muffler 16 are recorded by a built-in pulsation sensor 46.

The output noise of the tailpipe 17 is detected by a microphone 36 located adjacent thereto.

The signals from all these sensors and any desired additional sensors in the form of strain gauges, temperature sensors, etc., are subjected to a Fourier transform in a computing unit 2, and then compared with an acoustic signature stored in the computing unit. Deviations are detected, weighted with weighting factors, and combined into an overall picture that includes the running behavior of the engine, the acoustic behavior of the intake system, the acoustic behavior of the exhaust system, and the mechanical integrity of the metal parts and bearings.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control unit for monitoring a motor vehicle, the control unit comprising:

a plurality of inputs for receiving signals from a plurality of sensors provided on an intake system, an engine, or an exhaust system, the sensors being microphones, pulsation sensors, or strain gauges; and an analysis unit for analyzing the received signals, which are subjected to a Fourier transform, with a predetermined acoustic signature to determine an acoustic behavior of the intake system, the engine, or the exhaust system.

2. A method of monitoring a motor vehicle, the method comprising:

providing a plurality of sensors on an intake system, an engine, or an exhaust system, the sensors being microphones, pulsation sensors, or strain gauges;

receiving signals from the plurality of sensors by a control unit;

analyzing the received signals via Fourier analysis;

analyzing an acoustic behavior of the intake system, the engine, or the exhaust system by comparing the analyzed signals with a predetermined acoustic signature to monitor the motor vehicle.

3. A method for monitoring functional components of a motor vehicle, the functional units including an internal combustion engine, an exhaust system, a manifold, a catalytic converter, an exhaust particulate filter, a front muffler, a mid muffler, a rear muffler, an exhaust pipe or tailpipe, and an intake system the includes an intake muffler and/or intake pipes, the method comprising:

placing at least one microphone next to one of the functional components to be monitored;

placing at least one pulsation sensor on one of the functional components to be monitored;

placing at least one strain gauge on one of the functional components to be monitored;

placing a speed sensor on the engine;

measuring the electrical signals at the outputs of the microphones, pulsation sensors, strain gauges, and speed sensor on the engine;

analyzing the signals via Fourier analysis; and comparing the analyzed signals with an acoustic signature.

4. The method according to claim 3, further comprising: placing at least one thermocouple on one of the functional components to be monitored.

5. The method according to claim 3, further comprising: placing a microphone on the generator.

6. The method according to claim 3, further comprising: placing a microphone on the air conditioning system.

7. The method according to claim 3, further comprising: placing a microphone on the timing chain.

8. The method according to claim 3, further comprising: placing a microphone on the V-belt.

9. The method according to claim 3, wherein the microphones are piezoelectric transducers.

10. The method according to claim 3, wherein the microphones are electret microphones.

* * * * *